United States Patent
Lee et al.

(10) Patent No.: US 10,177,374 B2
(45) Date of Patent: Jan. 8, 2019

(54) SILICON-CONTAINING NEGATIVE ACTIVE MATERIAL, METHOD OF PREPARING THE SAME, NEGATIVE ELECTRODE INCLUDING THE SAME, AND LITHIUM SECONDARY BATTERY INCLUDING NEGATIVE ELECTRODE

(71) Applicants: Samsung Electronics Co., Ltd., Suwon-si, Gyeonggi-do (KR); Samsung SDI Co., Ltd., Yongin-si, Gyeonggi-do (KR)

(72) Inventors: Kanghee Lee, Suwon-si (KR); Heechul Jung, Gunpo-si (KR); Byoungsun Lee, Seoul (KR); Junho Lee, Hwaseong-si (KR)

(73) Assignees: SAMSUNG ELECTRONICS CO., LTD., Gyeonggi-Do (KR); SAMSUNG SDI CO., LTD, Gyeonggi-Do (KR)

( * ) Notice: Subject to any disclaimer, the term of this patent is extended or adjusted under 35 U.S.C. 154(b) by 392 days.

(21) Appl. No.: 14/985,561

(22) Filed: Dec. 31, 2015

(65) Prior Publication Data

US 2016/0190571 A1  Jun. 30, 2016

(30) Foreign Application Priority Data

Dec. 31, 2014  (KR) .................. 10-2014-0195963

(51) Int. Cl.
*H01M 4/38* (2006.01)
*H01M 4/36* (2006.01)
*H01M 4/04* (2006.01)
*H01M 4/62* (2006.01)
*H01M 10/052* (2010.01)

(52) U.S. Cl.
CPC ......... *H01M 4/386* (2013.01); *H01M 4/0471* (2013.01); *H01M 4/366* (2013.01); *H01M 4/625* (2013.01); *H01M 4/626* (2013.01); *H01M 10/052* (2013.01)

(58) Field of Classification Search
CPC ...... H01M 4/386; H01M 4/366; H01M 4/625; H01M 4/626; H01M 4/0471; H01M 10/052
See application file for complete search history.

(56) References Cited

U.S. PATENT DOCUMENTS

| 7,736,804 B2* | 6/2010 | Kim ............... H01M 4/364 429/231.8 |
| 2012/0049110 A1 | 3/2012 | Trukhan et al. |

OTHER PUBLICATIONS

Gou, et al., One-pot synthesis of a metal-organic framework as an anode for Li-ion batteries with improved capacity and cycling stability, Journal of Solid State Chemistry 210 (2014) pp. 121-124.

* cited by examiner

*Primary Examiner* — Laura Weiner
(74) *Attorney, Agent, or Firm* — Cantor Colburn LLP

(57) ABSTRACT

A silicon-containing negative active material may include a silicon particle and a coating layer surrounding the silicon particle, and the coating layer may include carbon and a metallic particle.

12 Claims, 7 Drawing Sheets

SILICON-CONTAINING NEGATIVE ACTIVE MATERIAL, METHOD OF PREPARING THE SAME, NEGATIVE ELECTRODE INCLUDING THE SAME, AND LITHIUM SECONDARY BATTERY INCLUDING NEGATIVE ELECTRODE

CROSS-REFERENCE TO RELATED APPLICATION

This application claims priority to Korean Patent Application No. 10-2014-0195963, filed on Dec. 31, 2014, and all the benefits accruing therefrom under 35 U.S.C. § 119, the content of which in its entirety is herein incorporated by reference.

BACKGROUND

1. Field

Exemplary embodiments of the invention relate to a silicon-containing negative active material, a method of preparing the silicon-containing negative active material, a negative electrode including the silicon-containing negative active material, and a lithium secondary battery including the negative electrode, and more particularly, to a silicon-containing negative active material including a coating layer that includes carbon and a metallic particle, a method of preparing the silicon-containing negative active material, a negative electrode including the silicon-containing negative active material, and a lithium secondary battery including the negative electrode.

2. Description of the Related Art

Lithium secondary batteries (also referred to as lithium ion batteries) have been utilized as the primary power source in small electronic products due to their stable charge-discharge behavior and high energy density.

Recently, there is a tendency that small mobile electronic products, e.g., smartphones, are equipped with a variety of functions, and have high performance. In addition, the need for large-scale electric power supply sources has significantly increased along with the commercialization of hybrid vehicles or electric vehicles. In order to meet such demands, there is an urgent need for a development of core materials of existing lithium secondary batteries, such as a negative electrode, a positive electrode, a separator, and an electrolyte, in order to significantly improve the performance thereof.

Among these, the development of a novel negative electrode material is very important since it may result in the development of lithium secondary batteries of high energy density by increasing a specific-capacity of the batteries.

The development of various negative electrode materials, such as silicon, germanium, tin or tin oxide, and iron oxide has continuously been conducted. Among the negative electrode materials, silicon materials have been a subject of focused research and development, due to its high theoretical capacity (3580 milliampere-hours per gram, $mAhg^{-1}$ as in the state of $Li_{15}Si_4$).

In general, conventional silicon materials were coated with electrical conductive carbon to improve electrical conductivity.

SUMMARY

When a lithium battery includes the conventional silicon material coated with electrical conductive carbon as a negative active material, the conventional silicon material may increase the irreversible capacity of the lithium battery and decrease lifespan characteristics.

Provided is a silicon-containing negative active material including a coating layer including carbon and a metallic particle.

Provided is a method of preparing the silicon-containing negative active material.

Provided is a negative electrode including the silicon-containing negative active material.

Provided is a lithium secondary battery including the negative electrode.

Additional exemplary embodiments will be set forth in part in the description which follows and, in part, will be apparent from the description, or may be learned by practice of the presented exemplary embodiments.

According to an exemplary embodiment, a silicon-containing negative active material includes a silicon particle, and a coating layer surrounding the silicon particle, where the coating layer comprises carbon and a metallic particle.

In an exemplary embodiment, the coating layer may include a first carbon film surrounding the metallic particle.

In an exemplary embodiment, the coating layer may further include a second carbon film not surrounding the metallic particle.

In an exemplary embodiment, the first carbon film and the second carbon film may each include about two layers to about fifteen layers of carbon layers stacked one over another.

In an exemplary embodiment, each of the carbon layers may have a concentric sphere shape.

In an exemplary embodiment, the metallic particle may include cobalt (Co), zinc (Zn), iron (Fe), nickel (Ni), tin (Sn), or a combination thereof.

In an exemplary embodiment, the average diameter of the metallic particle may be in a range of about 5 nanometers (nm) to about 30 nm.

In an exemplary embodiment, the average diameter of the silicon particle may be in a range of about 50 nm to about 500 nm.

In an exemplary embodiment, the thickness of the coating layer may be in a range of about 0.3 nm to about 30 nm.

In an exemplary embodiment, the coating layer may include carbide of a metal-organic framework ("MOF").

According to another exemplary embodiment, a method of preparing a silicon-containing negative active material includes obtaining a first combination by combining an MOF with a silicon particle, and forming a coating layer on a surface of the silicon particle by heat-treating the first combination, where the coating layer comprises carbon and a metallic particle.

In an exemplary embodiment, the MOF may include zeolitic imidazolate framework ("ZIF").

In an exemplary embodiment, the heat-treating may be performed at a temperature ranging from about 600 degrees Celsius to about 1500° C.

In an exemplary embodiment, the heat-treating may be performed in the presence of an inert gas.

In an exemplary embodiment, the first combination may further include a liquid medium.

In an exemplary embodiment, the liquid medium may include an alcohol.

According to another exemplary embodiment, a negative electrode may include the silicon-containing negative active material.

According to another exemplary embodiment, a lithium secondary battery may include the negative electrode.

BRIEF DESCRIPTION OF THE DRAWINGS

These and/or other exemplary embodiments will become apparent and more readily appreciated from the following description of the exemplary embodiments, taken in conjunction with the accompanying drawings in which.

DETAILED DESCRIPTION

Figure 1:
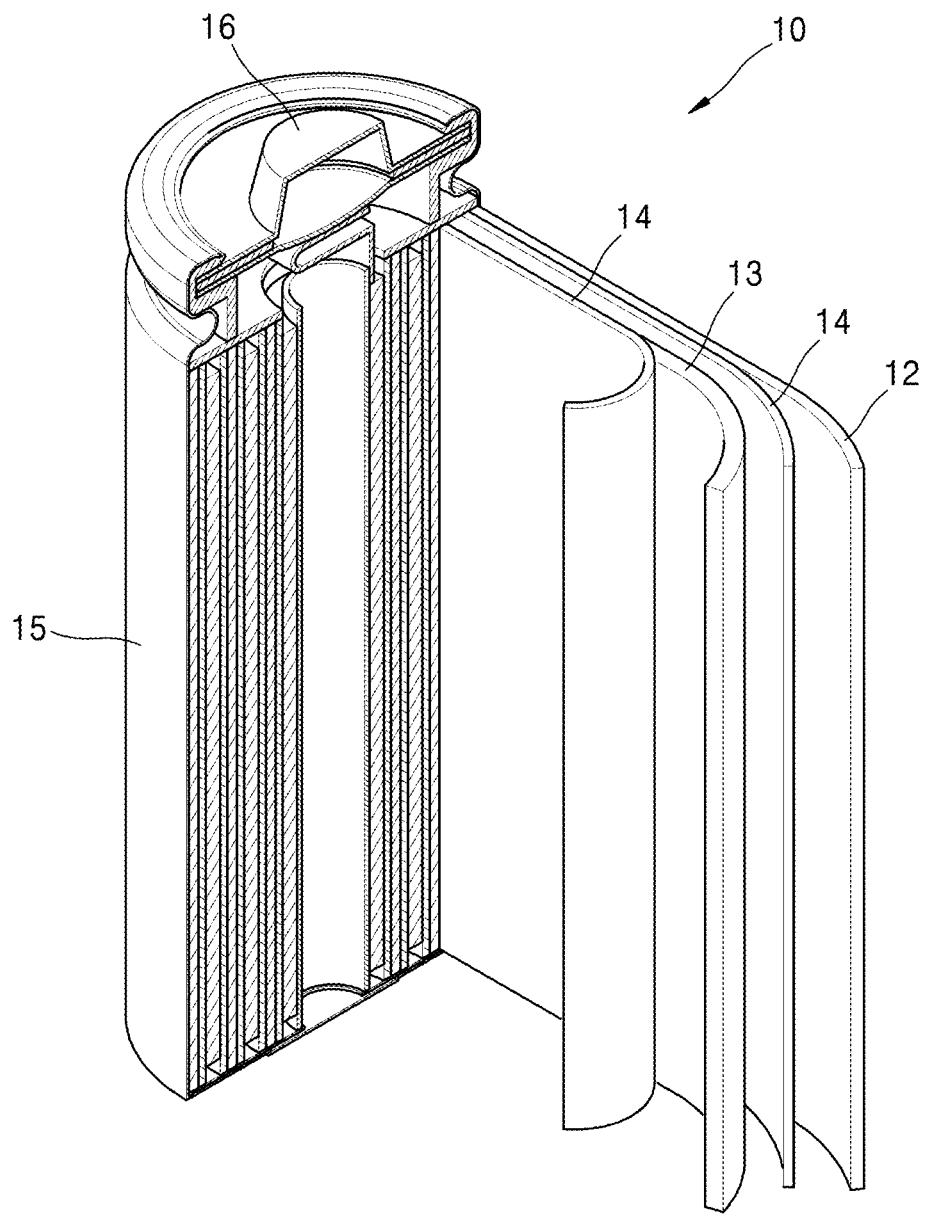
FIG. 1 is a schematic view illustrating an exemplary embodiment of a lithium secondary battery.

Reference will now be made in detail to exemplary embodiments, examples of which are illustrated in the accompanying drawings, where like reference numerals refer to like elements throughout. In this regard, the exemplary embodiments may have different forms and should not be construed as being limited to the descriptions set forth herein. Accordingly, the exemplary embodiments are merely described below, by referring to the figures, to explain exemplary embodiments. As used herein, the term "and/or" includes any and all combinations of one or more of the associated listed items.

In the specification, the term "metal-organic framework (MOF)" refers to a crystalline compound including metallic ions or metal clusters coordinated to organic molecules to form one-, two-, or three-dimensional structures that may be porous.

In the specification, the term "zeolitic imidazolate framework ("ZIF") compound" refers to a nanoporous compound that includes tetrahedral clusters in which transition metals are linked by an imidazolate ligand.

In the specification, the term "substituted compound" refers to a compound, in which a hydrogen atom is substituted with a substituent other than hydrogen, such as, a halogen atom, an alkyl group, a cycloalkyl group, an alkoxy group, an aryl group, an oxygen atom, a sulfur atom, or a nitrogen atom.

In the specification, the term "discharging" refers to a process of deintercalation of lithium ions from a negative electrode, and the term "charging" refers to a process of intercalation of lithium ions into a negative electrode.

It will be understood that when an element is referred to as being "on" another element, it can be directly on the other element or intervening elements may be therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. In an exemplary embodiment, when the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, when the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the invention, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. In an exemplary embodiment, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the claims.

Hereinafter a silicon-containing negative active material according to an exemplary embodiment will be described.

According to an exemplary embodiment, a silicon-containing negative active material may include a silicon particle and a coating layer surrounding the silicon particle.

In an exemplary embodiment, the coating layer may include carbon and a metallic particle.

The silicon particle may intercalate and deintercalate lithium ions. In addition, since the silicon particle serves as a catalyst that promotes a reaction between lithium ion and an electrolyte, as charging and discharging cycles of a lithium battery proceeds, the silicon particle may negatively serve to decrease the reversibility of intercalation and deintercalation of lithium ions.

In an exemplary embodiment, the average diameter of the silicon particle may be in a range of about 50 nanometers (nm) to about 500 nm, for example.

The carbon and the metallic particle may together prevent the silicon particle from directly contacting an electrolyte, thus suppressing a decrease of the reversibility of intercalation and deintercalation of lithium ions, in spite of cycle progression.

The metallic particle may serve to confer electrical conductivity to the silicon-containing negative active material.

The coating layer may include both of the carbon and the metallic particle, increasing the electrical conductivity of the silicon-containing negative active material and decreasing a degree of decrease of the reversibility of intercalation and deintercalation of lithium ions, which is followed by an increase of operating time of a lithium battery, as compared with the case that the coating layer includes no metallic particle but carbon only.

In an exemplary embodiment, the metallic particle may include cobalt (Co), zinc (Zn), iron (Fe), nickel (Ni), tin (Sn), or any combination thereof, for example.

In an exemplary embodiment, the average diameter of the metallic particle may be in a range of about 5 nm to about 30 nm, for example.

The coating layer may include a first carbon film surrounding the metallic particle.

In an exemplary embodiment, the first carbon film may include about two layers to about fifteen layers of first carbon layers stacked one over another.

In an exemplary embodiment, each of the first carbon layers may have a concentric sphere shape.

The coating layer may further include a second carbon film not surrounding the metallic particle.

In an exemplary embodiment, the second carbon film may include about two layers to about fifteen layers of second carbon layers stacked one over another.

In an exemplary embodiment, each of the second carbon layers may have a concentric sphere shape.

In an exemplary embodiment, the thickness of the coating layer may be in a range of about 0.3 nm to about 30 nm, for example. When the thickness of the coating layer is within this range, lithium ions may easily pass through the coating layer.

In an exemplary embodiment, the coating layer may include carbide of a metal-organic framework ("MOF").

The silicon-containing negative active material may have high electrical conductivity and inhibit a reaction between an electrolyte and lithium ions. Accordingly, the silicon-containing negative active material may decrease the irreversible capacity and improve lifespan characteristics of a lithium battery including the silicon-containing negative active material.

Hereinafter a method of preparing a silicon-containing negative active material according to an exemplary embodiment will be described.

A method of preparing a silicon-containing negative active material according to an exemplary embodiment may include forming a first combination by combining an MOF with a silicon particle (S10) and forming a coating layer on a surface of the silicon particle by heat-treating the first combination (S20).

The MOF and derivatives thereof may include at least one central metallic element of the Periodic Table of the Elements and an organic ligand.

In an exemplary embodiment, the central metallic element may include at least one of cobalt (Co), zinc (Zn), iron (Fe), nickel (Ni), and tin (Sn), for example.

In an exemplary embodiment, the organic ligand may include a functional group that is linkable to at least two metallic ions, for example.

In an exemplary embodiment, the MOF may be prepared by preparing a precursor solution by dissolving a metal precursor and an organic ligand precursor in a first solvent, forming an MOF by stirring the precursor solution at room temperature, i.e., about 25 degrees Celsius (° C.), and separating the formed MOF using a centrifuge, for example.

In an exemplary embodiment, the metal precursor may include, for example, at least one of a metal nitrate, a metal chloride, a metal bromide, a metal iodide, a metal acetate, a metal carbonate, a metal formate, a metal molybdate, a metal sulfate, a metal sulfide, a metal oxide, a metal fluoride, a metal phosphate, a metal perchlorate, a metal borate, and a metal hydroxide.

In an exemplary embodiment, the organic ligand precursor may include, for example, at least one organic combination of terephthalic acid, substituted terephthalic acid, tribenzoic acid, imidazole, substituted imidazole, pyridine, substituted pyridine, pyrazole, substituted pyrazole, tetrazole, and substituted tetrazole.

In an exemplary embodiment, the first solvent may include an alcohol including one of methanol, ethanol, propanol, and any combination thereof, for example.

In an exemplary embodiment, the MOF may include a ZIF, for example. In an exemplary embodiment, the ZIF may be obtained, for example, when the metal precursor is a cobalt nitrate, and the organic ligand precursor is 2-methyl imidazole.

In an exemplary embodiment, the first combination may further include a liquid medium, for example.

In an exemplary embodiment, the liquid medium may include an alcohol including one of methanol, ethanol, propanol, and any combination thereof, for example.

In an exemplary embodiment, the forming of a first combination (S10) may be performed by adding silicon powder and a MOF to the liquid medium.

In an exemplary embodiment, in the forming of a coating layer (S20), the heat-treating may be performed at a temperature ranging from about 600° C. to about 1500° C. When the heat-treating temperature is within this range, the MOF may be sufficiently carbonized and not react with silicon to form a secondary phase, such as SiC. In an exemplary embodiment, the heat-treating may be performed at a temperature of about 800° C. for about 2 hours, for example.

In addition, the heat-treating may be performed in the presence of an inert gas. In an exemplary embodiment, the inert gas may include one of nitrogen, helium, argon, neon, and any combination thereof, for example.

In an exemplary embodiment, the coating layer formed in the forming of a coating layer (S20) may include carbide of the MOF, for example.

A negative electrode according to an exemplary embodiment may include the silicon-containing negative active material.

In another exemplary embodiment, the negative electrode may further include other negative active materials suitable for use in a lithium secondary battery other than the silicon-containing negative active material.

Examples of the other negative active materials may include a carbonaceous material, a lithium metal, a lithium metal alloy, a silicon oxide material, or any combination thereof, which are capable of intercalation and deintercalation of lithium ions.

In an exemplary embodiment, the carbonaceous material may include at least one of carbon nanotubes, graphite, graphene, carbon black, and a carbonized polymer, for example. In an exemplary embodiment, the carbon nanotubes may include single-wall carbon nanotubes, multi-wall carbon nanotubes, or any combination thereof, for example.

The amount of the other negative active materials may be in a range of about 2 parts by weight to about 98 parts by weight, based on 100 parts by weight of the silicon-containing negative active material. When the amount of the other negative active materials is within this range, passages for migration of lithium ions may be sufficiently secured during an electrochemical reaction and the effect of substantial improvement in battery performance may be obtained.

The negative electrode may further include a binder and/or a conductive agent other than the silicon-containing negative active material described above and the other negative active materials.

The binder may facilitate binding between components of the negative electrode, such as the silicon-containing negative active material, the other negative active materials, and the conductive agent and binding of the negative electrode to a current collector. Examples of the binder include polyacrylic acid ("PAA"), polyvinylidene difluoride, polyvinyl alcohol, carboxymethyl cellulose ("CMC"), starch, hydroxypropyl cellulose, regenerated cellulose, polyvinylpyrrolidone, tetrafluoroethylene, polyethylene, polypropylene, ethylene-propylene-diene monomer ("EPDM"), sulfonated EPDM, styrene-butadiene-rubber, fluorinated rubber, or a variety of copolymers.

In an exemplary embodiment, the binder may include lithium ions.

In an exemplary embodiment, the amount of the binder may be in a range of about 1 part by weight to about 10 parts by weight, e.g., in a range of about 2 parts by weight to about 7 parts by weight, based on 100 parts by weight of a total weight of the silicon-containing negative active material and the other negative active materials. When the amount of the binder is within this range, e.g., about 1 part by weight to about 10 parts by weight, the binding force of the negative electrode to the current collector may be suitably strong.

The conductive agent is not particularly limited as long as the conductive agent has electric conductivity and does not induce an undesirable chemical change in the lithium secondary battery including the conductive agent.

In an exemplary embodiment, the conductive agent may include, for example, carbon black, which may be identical to or different from the carbon black described above, carbon fiber, graphite, which may be identical to or different from the graphite described above, or a combination thereof. In an exemplary embodiment, the carbon black may be, for example, acetylene black, Ketjen black, Super P carbon, channel black, furnace black, lamp black, thermal black, or a combination thereof. In an exemplary embodiment, the graphite may be natural graphite or artificial graphite, for example.

The negative electrode may additionally include other conductive agent other than the carbonaceous conductive agent described above.

In an exemplary embodiment, the other conductive agent may include at least one of an electrically conductive fiber, e.g., a metal fiber, metal powder, e.g., aluminum powder or nickel powder, a conductive whisker, e.g., a zinc oxide or a potassium titanate, and a polyphenylene derivative.

The silicon-containing negative active material may serve as a conductive agent due to the carbon and the metallic particle included in the coating layer, as well as an active material. Thus, the amount of the conductive agent in the silicon-containing negative active material may be less than the amount of a conductive agent in a conventional negative active material. In an exemplary embodiment, the amount of the conductive agent may be in a range of about 0.5 part by weight to about 10 parts by weight, e.g., in a range of about 0.01 part by weight to about 5 parts by weight, based on 100 parts by weight of a total weight of the silicon-containing negative active material and the other negative active materials. When the amount of the conductive agent is within this range, e.g., about 0.5 part by weight to about 10 parts by weight, a negative electrode having excellent ion conductivity may be obtained.

Hereinafter a method of manufacturing the negative electrode will be described in detail.

First, the silicon-containing negative active material according to an exemplary embodiment, the other negative active materials, the binder, the second solvent, the carbonaceous conductive agent, and/or the other conductive agent may be combined to prepare a composition for forming a negative active material layer.

Then, a negative electrode current collector may be coated with the composition for forming a negative active material layer and dried to thereby manufacture a negative electrode.

In an exemplary embodiment, the thickness of the negative electrode current collector may be in a range of about 3 micrometers (μm) to about 500 μm, for example. A material for the negative electrode current collector is not particularly limited as long as the material has suitable electrical conductivity while not causing an undesirable chemical change in the lithium secondary battery including the material. Examples of the material for the negative electrode current collector may include copper, stainless steel, aluminum, nickel, titanium, heat-treated carbon, copper or stainless steel that is surface-treated with carbon, nickel, titanium, or silver, and an aluminum-cadmium alloy. Also, similar to a positive electrode current collector, fine raggednesses may be formed on a surface of the negative electrode current collector to enhance binding force of the silicon-containing negative active material to the negative electrode current collector. The negative electrode current collector may be used in various forms, such as films, sheets, foils, nets, porous structures, foams, and non-woven fabrics.

Examples of the second solvent include, but are not limited to, N-methylpyrrolidone ("NMP"), acetone, water, or a combination thereof. The amount of the second solvent may be in a range of about 1 part by weight to about 50 parts by weight, based on 100 parts by weight of a total weight of the silicon-containing negative active material and the other negative active materials. When the amount of the second solvent is within this range, forming an active material layer may be facilitated.

A lithium secondary battery according to an exemplary embodiment includes the negative electrode.

FIG. 1 is a schematic view illustrating an exemplary embodiment of a lithium secondary battery 10.

Referring to FIG. 1, the lithium secondary battery 10 may include a positive electrode 13, a negative electrode 12, a separator 14 and battery case 15.

The positive electrode 13, the negative electrode 12, and the separator 14 may be wound or folded to be accommodated in a battery case 15. Then, an electrolyte (not shown) may be injected to the battery case 15, and a cap assembly 16 may seal the battery case 15, thereby manufacturing the lithium secondary battery 10. In exemplary embodiments, the battery case 15 may be a cylindrical type, a rectangular type, or a thin-film type, for example. In an exemplary embodiment, the lithium secondary battery 10 may be a large thin-film type battery, for example.

The lithium secondary battery may have excellent lifespan characteristics and initial efficiency as well as excellent capacity characteristics. In the specification, the "initial efficiency" may be obtained using Equation 1.

Initial efficiency (%)=(discharging capacity at the first cycle/charging capacity at the first cycle)× 100.     [Equation 1]

Hereinafter a method of manufacturing a lithium secondary battery according to an exemplary embodiment will be described in further detail.

First, a negative electrode may be manufactured based on the method described above.

A positive electrode may then be manufactured by a method similar with the method of manufacturing a negative electrode. In an exemplary embodiment, a lithium transition metal oxide, a binder, a conductive agent, and a solvent may be combined to prepare a composition for forming a positive electrode active material layer, for example. Then, a positive electrode current collector may be coated with the composition for forming a positive electrode active material layer and dried to thereby manufacture a positive electrode.

The types and the amounts of the binder, the conductive agent, and the solvent used to prepare the composition for forming a positive electrode active material layer may be the same as those for preparing the composition for forming a negative electrode active material layer.

In an exemplary embodiment, the lithium transition metal oxide may include at least one of $LiCoO_2$, $LiNiO_2$, $LiMnO_2$, $LiMn_2O_4$, $Li(Ni_aCo_bMn_c)O_2$ (where $0<a<1$, $0<b<1$, $0<c<1$, and $a+b+c=1$), $LiNi_{1-Y}Co_YO_2$, $LiCo_{1-Y}Mn_YO_2$, $LiNi_{1-Y}Mn_YO_2$ (where $0 \leq Y<1$), $LiMn_{2-z}Ni_zO_4$, $LiMn_{2-z}Co_zO_4$ (where $0<Z<2$), $LiCoPO_4$, and $LiFePO_4$, for example.

In an exemplary embodiment, the thickness of the positive electrode current collector may be in a range of about 3 μm to about 500 μm. A material for the positive electrode current collector is not particularly limited as long as the material for the positive electrode current collector has sufficient electrical conductivity and does not induce an undesirable chemical change in the lithium secondary battery including the material for the positive electrode current collector. Examples of the material for the positive electrode current collector may include stainless steel, aluminum, nickel, titanium, heat-treated carbon, and aluminum or stainless steel that is surface-treated with carbon, nickel, titanium, or silver. In addition, the positive electrode current collector may be processed to have fine raggednesses on surfaces thereof so as to enhance binding force of the positive active material to the positive electrode current collector, and may be used in various forms including films, sheets, foils, nets, porous structures, foams, and non-woven fabrics.

The lithium secondary battery may be manufactured by disposing a separator between the positive electrode and the negative electrode and supplying an organic liquid electrolyte thereto.

The lithium secondary battery may be manufactured by, for example, sequentially stacking the negative electrode, the separator, and the positive electrode, winding or folding the stacked structure, enclosing the wound or folded structure in a cylindrical-type or rectangular battery case or a pouch, and then injecting the organic liquid electrolyte to the battery case or the pouch.

In an exemplary embodiment, the pore diameter of the separator may be in a range of about 0.01 micrometer (μm) to about 10 μm, and the thickness of the separator may be in a range of about 5 μm to about 300 μm, for example. In particular, the separator may include, for example, an olefin-containing polymer, such as polypropylene or polyethylene, or a sheet or non-woven fabric including glass fibers.

The organic solvent may be prepared by dissolving a lithium salt in an organic solvent.

In an exemplary embodiment, the organic solvent may include one of propylene carbonate, ethylene carbonate, fluoroethylene carbonate, butylene carbonate, dimethyl carbonate, diethyl carbonate, methyl ethyl carbonate, methyl propyl carbonate, ethyl propyl carbonate, methyl isopropyl carbonate, dipropyl carbonate, dibutyl carbonate, benzonitrile, acetonitrile, tetrahydrofuran, 2-methyltetrahydrofuran, γ-butyrolactone, dioxolane, 4-methyldioxolane, N,N-dimethylformamide, dimethyl acetamide, dimethyl sulfoxide, dioxane, 1,2-dimethoxyethane, sulfolane, dichloroethane, chlorobenzene, nitrobenzene, diethylene glycol, dimethyl ether, and any combination thereof, for example.

In an exemplary embodiment, the lithium salt may include one of $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiAlO_2$, $LiAlCl_4$, $LiN(C_xF_{2x+1}SO_2)(C_yF_{2y+1}SO_2)$, where x and y are natural numbers, LiCl, LiI and any combination thereof, for example.

In a lithium secondary battery according to another embodiment, an organic solid electrolyte and/or an inorganic solid electrolyte may be used in combination with the organic liquid electrolyte. When the organic solid electrolyte and/or the inorganic solid electrolyte are used, the organic solid electrolyte and/or inorganic solid electrolyte may serve as a separator in some cases, and thus, the separator described above may be omitted when desired.

Examples of the organic solid electrolyte may include a polyethylene derivative, a polyethylene oxide derivative, a polypropylene oxide derivative, a phosphoric ester polymer, a polyester sulfide, a polyvinyl alcohol, and a polyvinylidene difluoride.

Examples of the inorganic solid electrolyte may include a lithium nitride, a lithium halide, and a lithium sulfide, such as $Li_3N$, $LiI$, $Li_5NI_2$, $Li_3N$—$LiI$—$LiOH$, $LiSiO_4$, $LiSiO_4$—$LiI$—$LiOH$, $Li_2SiS_3$, $Li_4SiO_4$, $Li_4SiO_4$—$LiI$—$LiOH$, and $Li_3PO_4$—$Li_2S$—$SiS_2$.

The silicon-containing negative active material will now be described in greater detail with reference to the following examples. However, the following examples are for illustrative purposes only and shall not limit the scope of this invention.

EXAMPLE

Preparation Example 1: Synthesis of MOF 13 g of 2-methyl imidazole and 6 g of cobalt nitrate ($Co(NO_3)_2 \cdot 6H_2O$) were added to 800 milliliter (mL) of methanol to obtain a first combination. The first combination was then stirred at room temperature (about 25° C.) for about 8 hours to obtain a second combination including MOF (in detail, ZIF). Subsequently, the second combination was centrifuged to thereby obtain MOF powder.

Example 1

(Preparation of Silicon-Containing Negative Active Material)

0.5 gram (g) of the MOF powder prepared in Preparation Example 1 and 1 g of silicon nanoparticles (SiNP, available from Kojundo Chemical Laboratory Co., Ltd) were added to 300 mL of methanol to obtain a third combination. Subsequently, the third combination was heat-treated at a temperature of about 800° C. for about 2 hours to obtain a silicon-containing negative active material coated with MOF carbide.

(Preparation of Negative Electrode and Coin Half-Cell)

The prepared silicon-containing negative active material and a binder solution were combined at a weight ratio of 9:1 to form a slurry for forming a negative active material layer. The binder solution was a Li-PAA solution having a concentration of about 4 volume %, which was prepared by dissolving polyacrylic acid (PAA, available from Aldrich) in water with lithium ions. Subsequently, a thin film of copper, which is a negative electrode current collector, having a thickness of about 15 micrometers (μm) was coated with the slurry for forming a negative active material layer in a bar coating method to have a thickness of about 45 μm. Then, the coated thin film of copper was primary-dried at 80° C., roll-pressed, secondary-dried at 120° C. under a vacuum atmosphere, and punched, thereby completing a manufacture of a negative electrode.

In an exemplary embodiment, the negative electrode was then wound in a round shape to have a diameter of about 12 millimeters (mm), and lithium metal was used as a counter electrode, thereby completing the manufacture of a 2032 type coin half-cell. Here, a 1.3 molar (M) $LiPF_6$ solution was used as an organic liquid electrolyte that is dissolved in a combined solvent, where the combined solvent is a combination of ethylene carbonate, diethylene carbonate, and fluoroethylene carbonate in a weight ratio of about 2:6:2.

Comparative Example 1

(Preparation of Silicon Negative Active Material Coated with Carbon)

1 g of cellulose acetate powder and 1 g of silicon nanoparticles (SiNP, available from Kojundo Chemical Laboratory Co., Ltd) were added to 10 mL of ethanol to obtain a fourth combination. Subsequently, the fourth combination was heat-treated at a temperature of about 600° C. for about 12 hours to obtain a silicon-containing negative active material coated with carbon.

(Preparation of Negative Electrode and Coin Half-Cell)

A negative electrode and a coin half-cell were manufactured in the same manner as in Example 1, except that the silicon-containing negative active material coated with carbon, which was prepared in Comparative Example 1, was used instead of the silicon-containing negative active material coated with MOF, which was prepared in Example 1.

Figure 2:
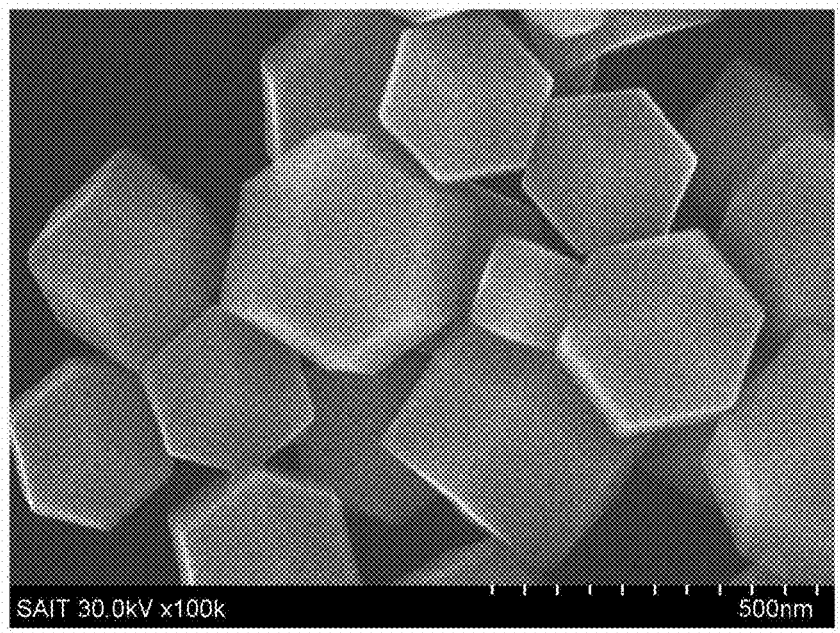
FIG. 2 is a transmission electron microscopy ("TEM") image of metal-organic framework ("MOF") prepared in Preparation Example 1.

Evaluation Example 1: Analysis of Transmission Electron Microscopy ("TEM") Images of MOF and Carbide of MOF FIG. 2 is a TEM image of MOF prepared in Preparation Example 1 imaged by a TEM analysis apparatus (TITAN-80-300). In addition, the MOF prepared in Preparation Example 1 was heat-treated at a temperature of about 800° C. for about 2 hours to obtain carbide of MOF. Subsequently, the carbide of MOF was imaged by a TEM analysis apparatus (TITAN-80-300) to obtain a TEM image thereof. The TEM image thereof is shown in FIG. 3.

Figure 3:
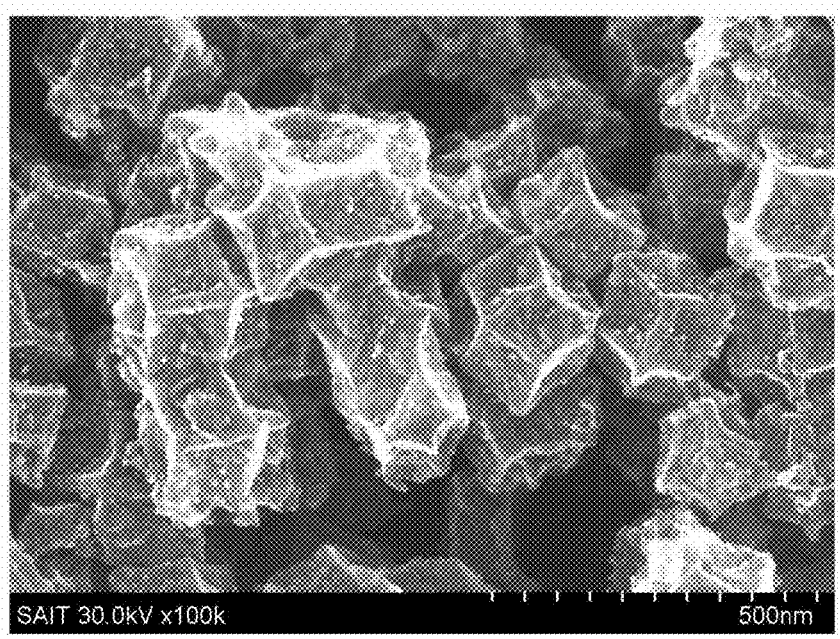
FIG. 3 is a TEM image of carbide of MOF formed by heat-treating the MOF in FIG. 2.

Referring to FIGS. 2 and 3, the carbide of MOF was found to have partially deformed structure compared to the basic structure of MOF, due to breaking of the basic structure of MOF during heat-treating.

Evaluation Example 2: Analysis of High-Resolution Transmission Electron Microscopy ("HR-TEM") Images of Silicon-Containing Negative Active Material Coated with MOF HR-TEM images of the silicon-containing negative active material coated with MOF, prepared in Example 1 were imaged by TEM analysis apparatus (TITAN-80-300). The HR-TEM images thereof are shown in FIGS. 4A and 4B and 5A and 5B. FIG. 4B is a partial enlarged view of FIG. 4A. FIG. 5B is an enlarged view of a region A indicated in FIG. 5A.

Figure 4A:
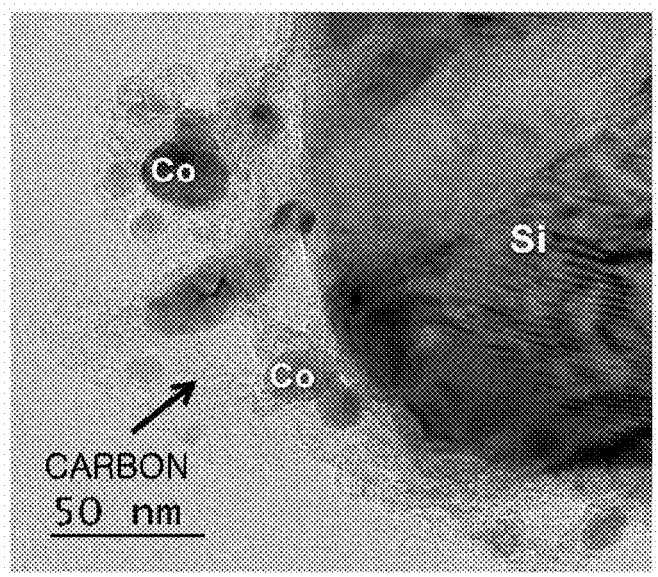
FIGS. 4A, 4B, 5A and 5B are high-resolution transmission electron microscopy ("HR-TEM") images of the silicon-containing negative active material prepared in Example 1.
Figure 4B:
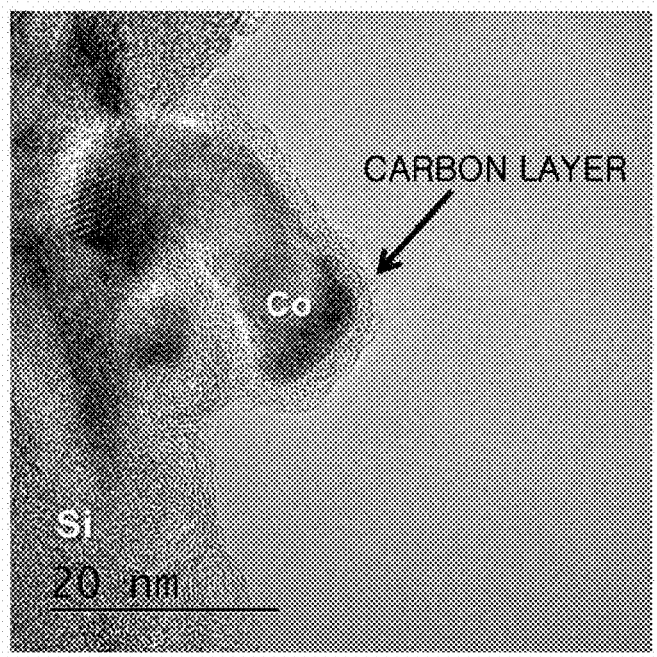

Referring to FIGS. 4A and 4B, the silicon particle (Si) was found to be completely surrounded by a coating layer including cobalt (Co) and carbon. Further, the coating layer was found to include a carbon layer, i.e., a carbon film, surrounding the cobalt particle (Co).

Figure 5A:
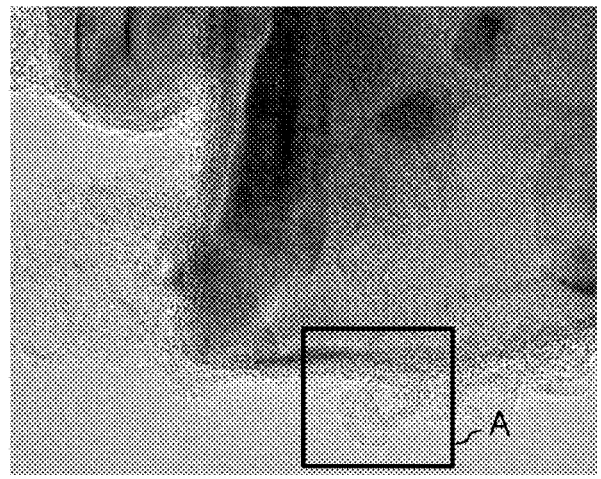
Figure 5B:
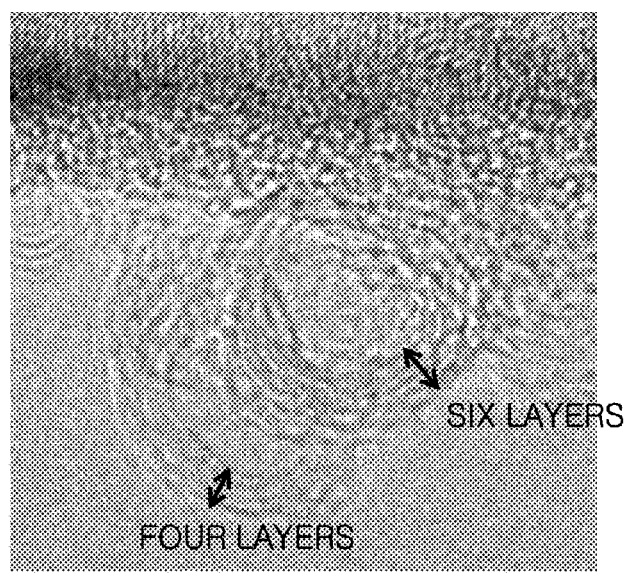

Referring to FIGS. 5A and 5B, the coating layer surrounding the silicon particle (Si) was found to include a carbon layer not surrounding a cobalt particle (Co), i.e., a carbon layer not including a cobalt particle therein. Further, the carbon layer was found to have 4 layers or 6 layers, where each layer has a concentric sphere shape.

Evaluation Example 3: Evaluation of Charge and Discharge Characteristics

Charge and discharge characteristics of the coin half-cells prepared in Example 1 and Comparative Example 1 were evaluated using a charger and discharger (TOYO-3100, available from TOYO SYSTEM Co. Ltd.). In greater detail, each coin half-cell was charged at a C-rate of about 0.2 C (unit: mA/g) at room temperature of about 25° C. until a voltage of about 0.01 V was reached. Then, each coin half-cell was discharged at a C-rate of about 0.2 C until a voltage of about 1.5 V was reached (formation process). Thereafter, the each of the coin half-cells was rested for about 10 minutes. Subsequently, in the first (n=1) and the following cycles (n≥2), each coin half-cell was charged at a C-rate of 0.5 C at room temperature of about 25° C. until a voltage of 0.01 V was reached. Then each coin half-cell was discharged at a C-rate of about 0.5 C until the voltage of about 0.01 V was reached. The charge and discharge cycle described above was repeated 100 times (that is, n=100). The letter "C" denotes a discharge rate, which is a value obtained by dividing the total capacity of the cell by the total discharge time of the cell.

<Voltage Profile Evaluation>

Figure 6:
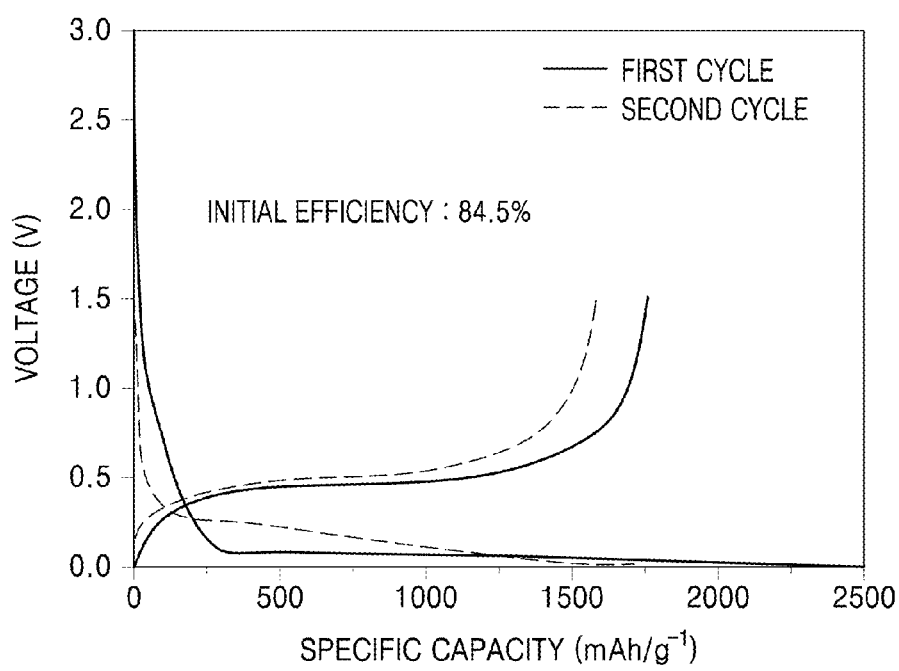
FIG. 6 is a graph of voltage measured in terms of Volts (V) versus specific capacity measured in terms of milliampere-hours per gram ($mAhg^{-1}$) showing a voltage profile according to the number of cycles of a coin half-cell manufactured in Example 1.
Figure 7:
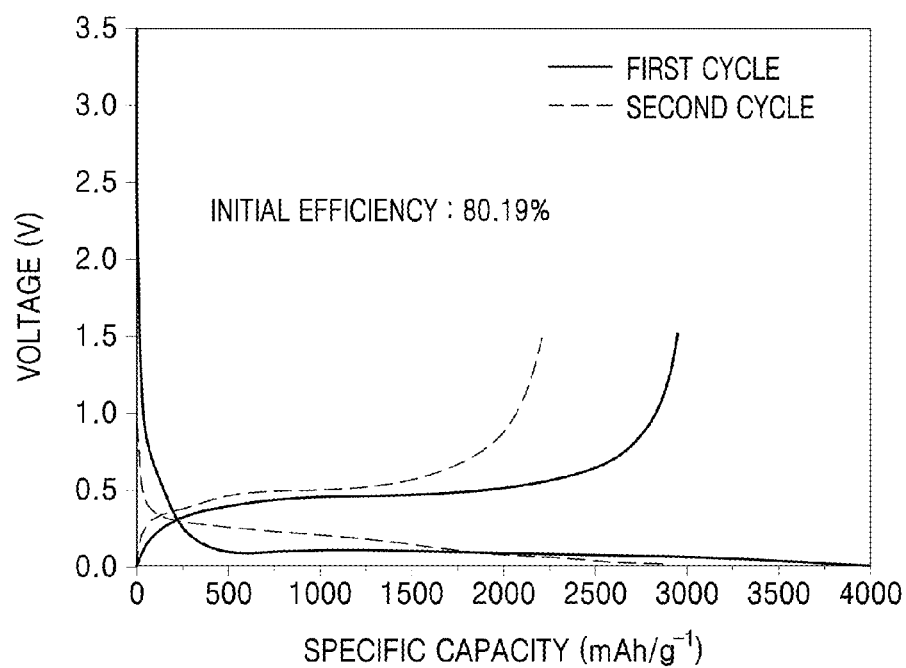
FIG. 7 is a graph of voltage (V) versus specific capacity ($mAhg^{-1}$) showing a voltage profile according to the number of cycles of a coin half-cell manufactured in Comparative Example 1.

Voltage profiles according to the number of cycles of the coin half-cells manufactured in Example 1 and Comparative Example 1 are shown in FIGS. 6 and 7, respectively. In addition, the initial efficiency of the each coin half-cell is shown in FIGS. 6 and 7. FIG. 6 is a graph illustrating a voltage profile according to the number of cycles of the coin half-cell manufactured in Example 1, and FIG. 7 is a graph illustrating a voltage profile according to the number of cycles of the coin half-cell manufactured in Comparative Example 1.

Referring to FIG. 6, the coin half-cell manufactured in Example 1 had high initial efficiency, and although the number of charge/discharge cycles increased, the coin half-cell manufactured in Example 1 exhibited stable charge/discharge behavior without a drastic decrease of capacity, i.e., exhibited small irreversible capacity.

Referring to FIG. 7, the coin half-cell manufactured in Comparative Example 1 had small initial efficiency, and the coin half-cell manufactured in Comparative Example 1 exhibited a drastic decrease of capacity, as the number of cycles increased, i.e., exhibited large irreversible capacity.

<Cycle Lifespan Comparison>

Cycle lifespan of the coin half-cells manufactured in Example 1 and Comparative Example 1 are shown in FIG. 11.

Figure 8:
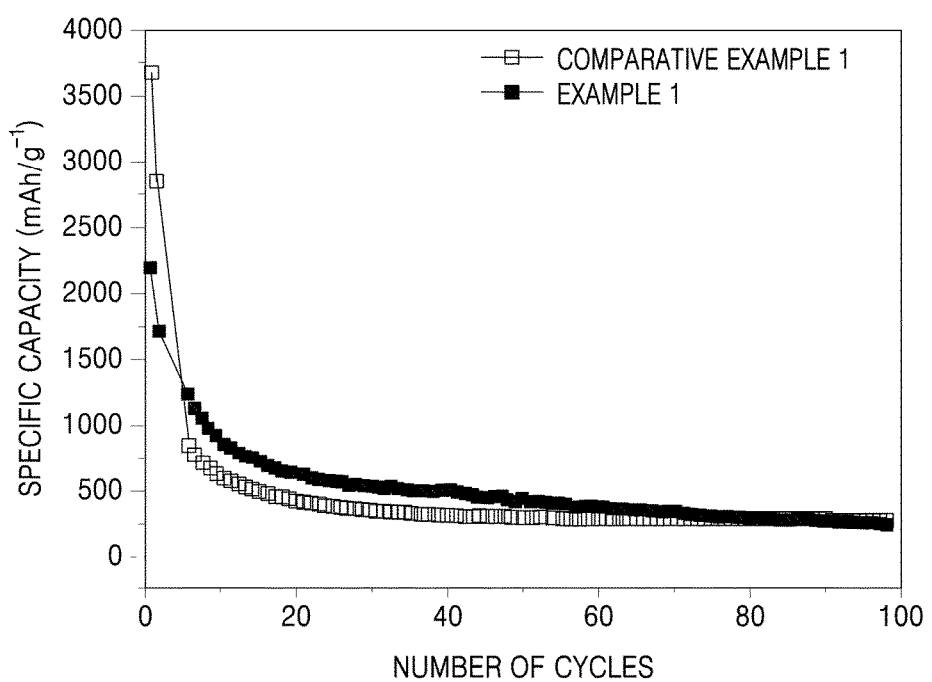
FIG. 8 is a graph of specific capacity ($mAhg^{-1}$) versus cycle number showing a cycle lifespan comparison between the coin half-cells manufactured in Example 1 and Comparative Example 1.

Referring to FIG. 8, it was found that the coin half-cell manufactured in Example 1 had an excellent cycle lifespan compared to the coin half-cell manufactured in Comparative Example 1.

The silicon-containing negative active material according to an exemplary embodiment may have high electrical conductivity and suppress a reaction between an electrolyte and lithium ions. Accordingly, the silicon-containing negative active material may decrease the irreversible capacity and improve lifespan characteristics of a lithium battery including the silicon-containing negative active material.

It should be understood that exemplary embodiments described herein should be considered in a descriptive sense only and not for purposes of limitation. Descriptions of features or exemplary embodiments within each exemplary embodiment should typically be considered as available for other similar features or exemplary embodiments in other exemplary embodiments.

While one or more exemplary embodiments have been described with reference to the figures, it will be understood by those of ordinary skill in the art that various changes in form and details may be made therein without departing from the spirit and scope as defined by the following claims.

What is claimed is:

1. A silicon-containing negative active material comprising:
   a silicon particle; and
   a coating layer which comprises carbon and a metallic particle, and surrounds the silicon particle,
   wherein the coating layer comprises a first carbon film comprising the carbon and surrounding the metallic particle, and
   wherein the first carbon film comprises about two layers to about fifteen layers of first carbon layers stacked one over another.

2. The silicon-containing negative active material of claim 1, wherein each of the first carbon layers has a concentric sphere shape.

3. The silicon-containing negative active material of claim 1, wherein the coating layer further comprises a second carbon film not surrounding the metallic particle.

4. The silicon-containing negative active material of claim 3, wherein the second carbon film comprises about two layers to about fifteen layers of second carbon layers stacked one over another.

5. The silicon-containing negative active material of claim 4, wherein each of the second carbon layers has a concentric sphere shape.

6. The silicon-containing negative active material of claim 1, wherein the metallic particle comprises one of cobalt (Co), zinc (Zn), iron (Fe), nickel (Ni), tin (Sn), and any combination thereof.

7. The silicon-containing negative active material of claim 1, wherein the metallic particle has an average diameter in a range of about 5 nanometers to about 30 nanometers.

8. The silicon-containing negative active material of claim 1, wherein the silicon particle has an average diameter in a range of about 50 nanometers to about 500 nanometers.

9. The silicon-containing negative active material of claim 1, wherein the coating layer has a thickness in a range of about 0.3 nanometers to about 30 nanometers.

10. The silicon-containing negative active material of claim 1, wherein the coating layer comprises carbide of a metal-organic framework.

11. A negative electrode comprising a current collector on which a silicon-containing negative active material is disposed, the silicon-containing negative active material comprising:
    a silicon particle; and
    a coating layer which comprises carbon and a metallic particle, and surrounds the silicon particle,
    wherein the coating layer comprises a first carbon film comprising the carbon and surrounding the metallic particle, and
    wherein the first carbon film comprises about two layers to about fifteen layers of first carbon layers stacked one over another.

12. A lithium secondary battery comprising:
    a positive electrode;
    an electrolyte; and
    a negative electrode comprising a current collector on which on which a silicon-containing negative active material is disposed, the silicon-containing negative active material comprising:
    a silicon particle; and
    a coating layer which comprises carbon and a metallic particle, and surrounds the silicon particle, wherein the coating layer comprises a first carbon film comprising the carbon and surrounding the metallic particle, and
wherein the first carbon film comprises about two layers to about fifteen layers of first carbon layers stacked one over another.

* * * * *